US011102282B2

(12) United States Patent
Chatt et al.

(10) Patent No.: US 11,102,282 B2
(45) Date of Patent: *Aug. 24, 2021

(54) METHOD FOR MANAGING AND ALLOCATING RESOURCES IN A CLUSTERED COMPUTING ENVIRONMENT

(71) Applicant: International Business Machines Corporation, Armonk, NY (US)

(72) Inventors: Alex C. Chatt, Winchester (GB); Andrew Dunnings, Southampton (GB); Samuel Hawker, Winchester (GB); Uchendu Emmanuel Nnorom, Winchester (GB); Simon Francis Page, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 48 days.

This patent is subject to a terminal disclaimer.

(21) Appl. No.: 16/519,623

(22) Filed: Jul. 23, 2019

(65) Prior Publication Data
US 2020/0267212 A1    Aug. 20, 2020

Related U.S. Application Data

(63) Continuation of application No. 16/277,403, filed on Feb. 15, 2019.

(51) Int. Cl.
*H04L 29/08* (2006.01)
*H04L 12/927* (2013.01)

(52) U.S. Cl.
CPC ........ *H04L 67/1008* (2013.01); *H04L 47/803* (2013.01); *H04L 67/1034* (2013.01)

(58) Field of Classification Search
CPC ............. H04L 67/1008; H04L 47/803; H04L 67/1034

(Continued)

(56) References Cited

U.S. PATENT DOCUMENTS 9,760,400 B1 *  9/2017  Emelyanov ........... G06F 9/4856
10,452,529 B1   10/2019 Davis
(Continued)

FOREIGN PATENT DOCUMENTS

CN    106919445    7/2017
CN    107193504    9/2017

OTHER PUBLICATIONS

Kubernetes—Managing Compute Resources for Containers; printed Nov. 27, 2018, 16 pages; copyright 2018 The Kubernetes Authors; copyright 2018 The Linux Foundation; https://kubernetes.io/docs/concepts/configuration/manage-compute-resources-container/.

(Continued)

Primary Examiner — Kevin T Bates
Assistant Examiner — Chen-Liang Huang
(74) Attorney, Agent, or Firm — Christopher M. Pignato; Nicholas L. Cadmus

(57) ABSTRACT

This present invention is directed towards a container orchestration method such as Kubernetes in which pods monitor themselves to determine if they are likely to require additional resources or vertical scaling within a given timeframe. If the pod determines that it will need additional processing power it notifies the state manager to begin allocating these resources on the same node or a different virtual or physical node before the CPU usage reaches 99%+. The state manager receives this request and allocates the necessary resources ahead of time. When the pod's CPU usage reaches 99%+, the state manager will remove the pod from the existing node and moves the application to the new pod on a different node in which sufficient resources are allocated. This invention brings about efficient utilization of nodes.

17 Claims, 4 Drawing Sheets

(58) Field of Classification Search
USPC .......................................................... 709/224
See application file for complete search history.

(56) References Cited

U.S. PATENT DOCUMENTS

| | | | |
|---|---|---|---|
| 2003/0204786 A1* | 10/2003 | Dinker | H04L 45/22 |
| | | | 714/43 |
| 2015/0295781 A1* | 10/2015 | Maes | G06F 3/0482 |
| | | | 715/735 |
| 2016/0182315 A1* | 6/2016 | Salokanto | H04L 41/5054 |
| | | | 709/226 |
| 2016/0359955 A1 | 12/2016 | Gill et al. | |
| 2018/0013636 A1 | 1/2018 | Seetharamaiah et al. | |
| 2018/0109464 A1* | 4/2018 | Chen | G06F 9/5077 |
| 2018/0225250 A1* | 8/2018 | Arroyo | G06F 9/5077 |
| 2019/0171481 A1* | 6/2019 | Bower, III | G06F 11/3055 |
| 2020/0026560 A1* | 1/2020 | Singh | G06F 9/5005 |
| 2020/0225990 A1* | 7/2020 | Vaddi | G06F 9/45558 |
| 2020/0267210 A1 | 8/2020 | Chatt | |

OTHER PUBLICATIONS

Arijs, Peter, Kubernetes Resource Usage: How Do You Manage and Monitor It?; DZone Cloud Zone dated Jan. 31, 2018; https://dzone.com/articles/kubernetes-resource-usage-how-do-you-manage-and-mo; printed Nov. 27, 2018; 5 pages.

Kgrygiel, etl al.; Vertical Pod Autoscaler; https://github.com/kubernetes/community/blob/master/contributors/design-proposals/autoscaling/verlical-pod-autoscaler.md; printed Nov. 27, 2018, 12 pages.

U.S. Appl. No. 16/277,403—PDF from Private Pair of parent case, U.S. Appl. No. 16/277,403, filed Jul. 11, 2019.

List of IBM Patents or Applications Treated as Related—Appendix P.

* cited by examiner

METHOD FOR MANAGING AND ALLOCATING RESOURCES IN A CLUSTERED COMPUTING ENVIRONMENT

FIELD OF THE INVENTION

The present disclosure is directed generally to a method for managing available resources in an open source computer cluster environment.

BACKGROUND

Virtualized computing environments (VCEs) are known. VCEs can be stored as "images." A new active instance of the VCE can be instantiated from the image. Two types of VCEs are virtual machines and containers. A container is a VCE that uses operating-system-level virtualization. This refers to an operating system feature in which the kernel allows the existence of multiple isolated user-space instances, called containers. These isolated user-space instances may look like real computers from the point of view of programs running in them (sometimes herein referred to as "containerized applications"). A computer program running on an ordinary operating system can see all resources (connected devices, files and folders, network shares, CPU power, quantifiable hardware capabilities) of that computer. However, programs running inside a container can only see the container's contents and devices assigned to the container.

"Clustered computing environments" (sometimes herein referred to as a "clustered environment"), as that term is used herein refers to a group of interconnected computers that are working together as one unit. Within a cluster, individual computers can be coupled either loosely or tightly. A loosely-coupled cluster consists of computers that are running with a minimum communication and cooperation among them. This results in efficient usage of each individual computer, but limits the amount of coordination and sharing of workloads. A tightly-coupled cluster consists of a group of computers that are cooperating to a great degree among each other, coordinating and sharing workload, and communicating status details on a continuous basis.

Clustered computing environments typically include "nodes." The term "node" is herein used to mean a computing machine in the clustered computing environment.

As the term is used herein, "computing resources" is defined as measurable quantities in a computing environment that can be requested, allocated, and consumed. Computing resources may include, but are not necessarily limited to the following types of computing resources: CPU, memory (RAM), node disk space, networks, servers, processing, storage, applications, and virtual machines.

Kubernetes is developed for managing containerized applications in a clustered environment. Today we have very complex software applications. These need to be deployed and updated at a very rapid pace. With many containers, it becomes difficult to manage and keep each running in production. On the other hand, each of these containers will require replicas for scale out and high availability.

Management means the process of automated arrangement, coordination and management of complex computer systems, middleware and services. With it, you can schedule and deploy any number of container replicas onto a node cluster and Kubernetes will take care of making decisions like which containers go on which servers.

SUMMARY

The invention revolves around creating a separate node within the cluster, for example a Kubernetes cluster, called a "state manager". This state manager uses a "race for resource principle" in order to manage the resources used by other nodes and pods inside the cluster. Its job is to facilitate automatic vertical scaling of applications deployed within a cluster.

According to an aspect of this invention, a method for managing and allocating computing resources amongst a plurality of computing machines each of which has a plurality of containerized computer applications stored thereon and all of which are stored in a clustered computing environment, the method comprising: determining a first allocation scheme for allocating computing resources of a first physical computing machine among a plurality of containerized applications to be run on the first physical computing machine; allocating the computing resources of the first physical computing machine according to the first allocation scheme so that each containerized application has respectively allocated an initial set of computing resources; running the plurality of containerized applications on the first physical computing machine, with each containerized application of the plurality of applications respectively using its respective initial set of computing resources; during the running of the plurality of containerized applications, receiving, from a resource monitor, computing resource data; determining that a first containerized application of the plurality of containerized applications needs additional computing resources to continue running reliably based upon the computing resource data; responsive to the determination that the first containerized application of the plurality of containerized applications needs additional computing resources, determining a second allocation scheme for allocating computing resources of a first physical computing machine among a plurality of containerized applications running on the first physical computing machine, with the second allocation scheme transferring a set of transferred computing resources from a second containerized application of the plurality of containerized resources to the first containerized application; and during the running of the plurality of containerized applications, re-allocating the computing resources of the first physical computing machine from the first allocation scheme to the second allocation scheme so that each containerized application is respectively allocated a revised set of computing resources, whereby the first containerized application receives the set of transferred resource(s) from the second containerized application in the revised set of resources of the first containerized application.

According to an aspect of this invention, a method for managing and allocating computing resources amongst a plurality of computing machines each of which has a plurality of containerized computer applications stored thereon and all of which are stored in a clustered computing environment, the method comprising: determining a first allocation scheme for allocating computing resources of a first physical computing machine among a plurality of containerized applications to be run on the first physical computing machine; allocating the computing resources of the first physical computing machine according to the first allocation scheme so that each containerized application has respectively allocated an initial set of computing resources; running the plurality of containerized applications on the first physical computing machine, with each containerized application of the plurality of applications respectively using its respective initial set of computing resources; during the running of the plurality of containerized applications, receiving, from a resource monitor, computing resource data; determining that a first containerized application of the plurality of containerized applications needs additional computing resources to continue running reliably based upon the computing resource data; and responsive to the determination that the first containerized application of the plurality of containerized applications needs additional computing resources and sufficient computing resources are not available on the first physical computing machine, determining a second allocation scheme for allocating computing resources of a second physical computing machine among a plurality of containerized applications running on the second physical computing machine, wherein the first containerized application on the first physical computing machine is transferred to the second physical computing machine with the second allocation scheme with additional computing resources.

According to an aspect of this invention, a method for managing and allocating computing resources amongst a plurality of computing machines each of which has a plurality of containerized computer applications stored thereon and all of which are stored in a clustered computing environment, the method comprising: determining a first allocation scheme for allocating computing resources of a first physical computing machine among a plurality of containerized applications to be run on the first physical computing machine; allocating the computing resources of the first physical computing machine according to the first allocation scheme so that each containerized application has respectively allocated an initial set of computing resources; running the plurality of containerized applications on the first physical computing machine, with each containerized application of the plurality of applications respectively using its respective initial set of computing resources; during the running of the plurality of containerized applications, receiving, from a resource monitor, computing resource data; determining that a first containerized application of the plurality of containerized applications needs additional computing resources to continue running reliably based upon the computing resource data; responsive to the determination that the first containerized application of the plurality of containerized applications needs additional computing resources and sufficient computing resources are not available on the first physical computing machine or any of the plurality of physical computing machines, determining a second allocation scheme for allocating computing resources of a virtual computing machine among a plurality of containerized applications running on the virtual computing machine, wherein the first containerized application on the first physical computing machine is transferred to the virtual computing machine with the second allocation scheme with additional computing resources.

According to an embodiment, deploying a state manager within the cluster thereby lowering latency on the communication between pods and the state manager.

According to an embodiment, replicating the state manager across multiple nodes within the cluster.

According to an embodiment, the computing resource data comprises percent CPU usage.

According to an embodiment, allocating computing resources at a threshold of percent CPU usage via the adapted resource allocator.

According to an embodiment, allocating, via the adapted resource allocator, computing resources from one containerized computer application to another of the containerized computer applications stored within the same computing machine if the said computing machine has sufficient computing resources available.

According to an embodiment, deducting, via the adapted resource allocator, computing resources from a second of the plurality of computing machines and creating a new containerized computer application within the first computing machine and deducting computing resources from the newly containerized computer application and assigning the deducted computing resource therefrom to another containerized computing application stored within the same first computing machine if the first computing machine does not have sufficient computing resources available and there exists a second existing computing machine from the plurality of computing machines in which there exists sufficient computing resources.

According to an embodiment, allocating, via the adapted resource allocator, computing resources by creating a new computing machine and a new containerized computer application within the new computing machine from which computing resources may then be deducted if there does not exist sufficient computing resources on the same computing machine or any of the plurality of existing computing machines.

According to an embodiment, sending error messages or distress signals for individual pods requiring greater computing resources if the program fails or does not find additional computing resources.

According to an embodiment, each pod reads the percent CPU usage for said pod.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

Some embodiments of the present invention may recognize one, or more, of the following problems, challenges and/or opportunities for improvement with respect to the current state of the are: (i) if a node is consistently running at 70% CPU usage and the node CPU usage starts to increase over time, it may be necessary to use resources from a different node to accommodate the increased usage; (ii) if all nodes are operating at or near capacity a new node with additional capacity may need to be created to accommodate the increased usage; (iii) such node creation takes time and will therefore result in some downtime with regard to the containerized applications that are in need of the additional capacity; (iv) there is a need in the art for a tool that can manage and allocate computing resources amongst containers in a clustered environment; (v) there is a further need in the art for a tool that can create new capacity before it is actually needed such that its capacity is ready to be allocated as soon as it is needed.

The present disclosure describes a computer based tool for using a state manager to perform a pod-based vertical scaling in a multi-tenant node based environment in a cluster environment, for example, a Kubernetes cluster. Some embodiments of the present invention may include one, or more, of the following features, characteristics, advantages and/or operations: (i) a tool that balances computing resources amongst containerized applications in a cluster environment; and/or (ii) when one container is in need of additional computing resources to run effectively, responsive allocation of computing resources amongst the containers in the clustered environment.

Figure 1:
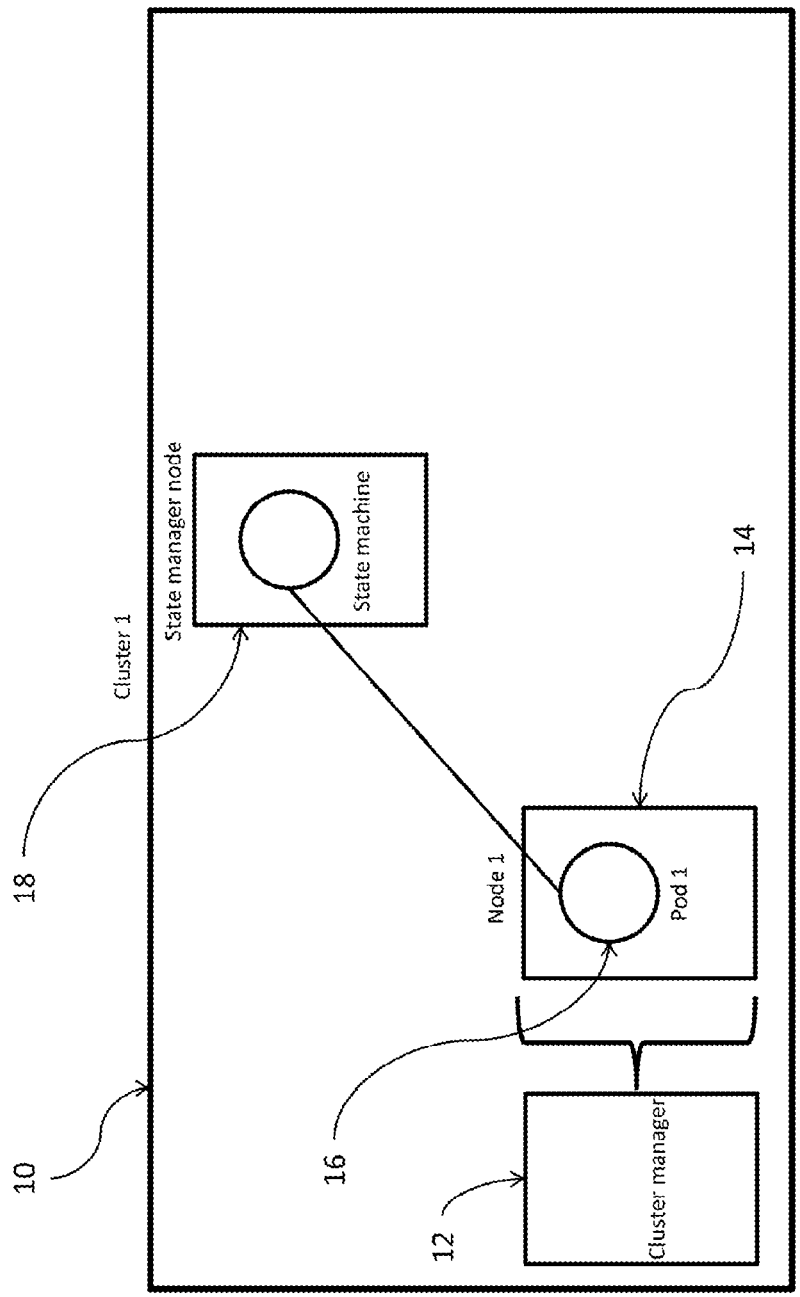
FIG. 1 is a depiction of a computing cluster which contains a State manager node and Pod 1 (with a monitoring program) on Node 1 which is requesting more processing power to the State manager node, in accordance with an embodiment.
Figure 2:
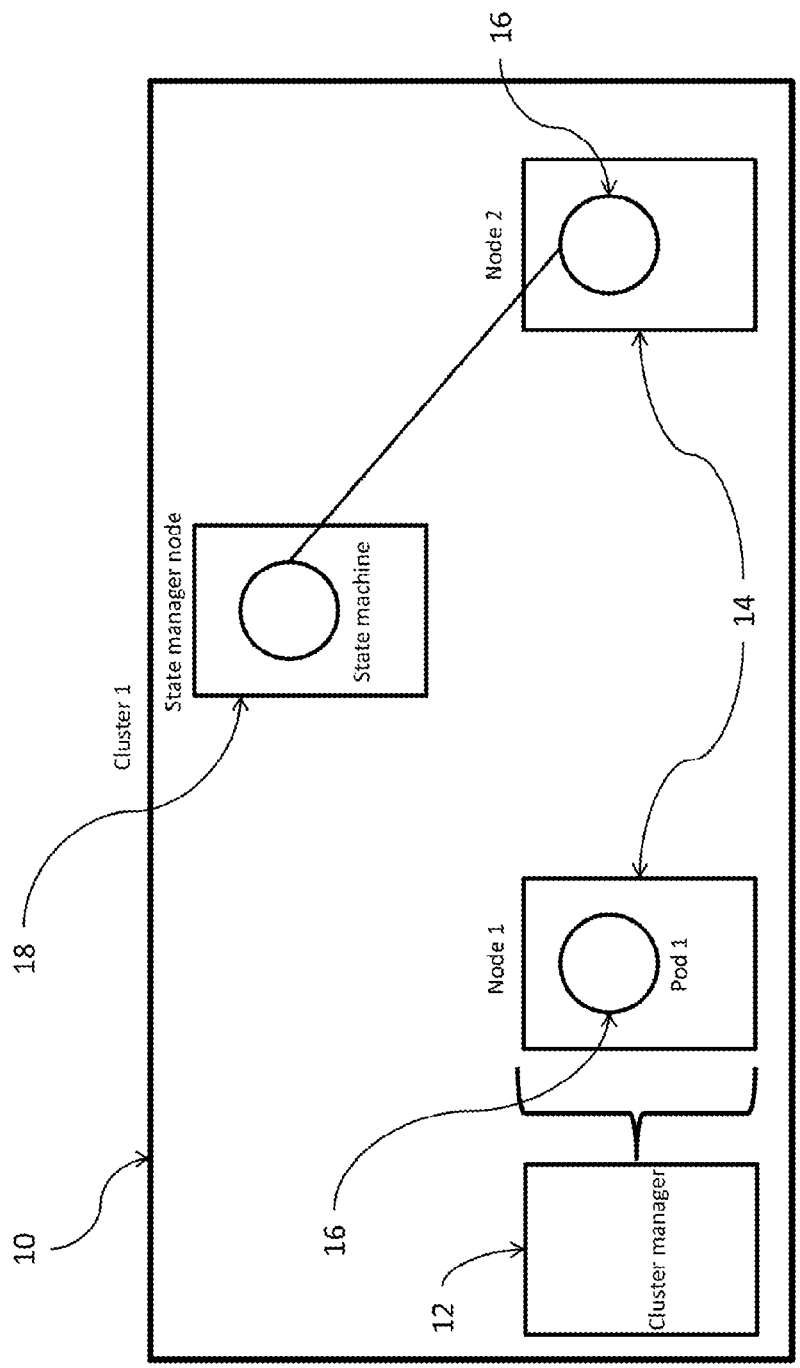
FIG. 2 is a depiction of a computing cluster in which the State manager node creates a new node (Node 2) with a pod that will have a larger amount of CPU's/memory assigned to it to handle Node 1's request for more processing power, in accordance with an embodiment.
Figure 3:
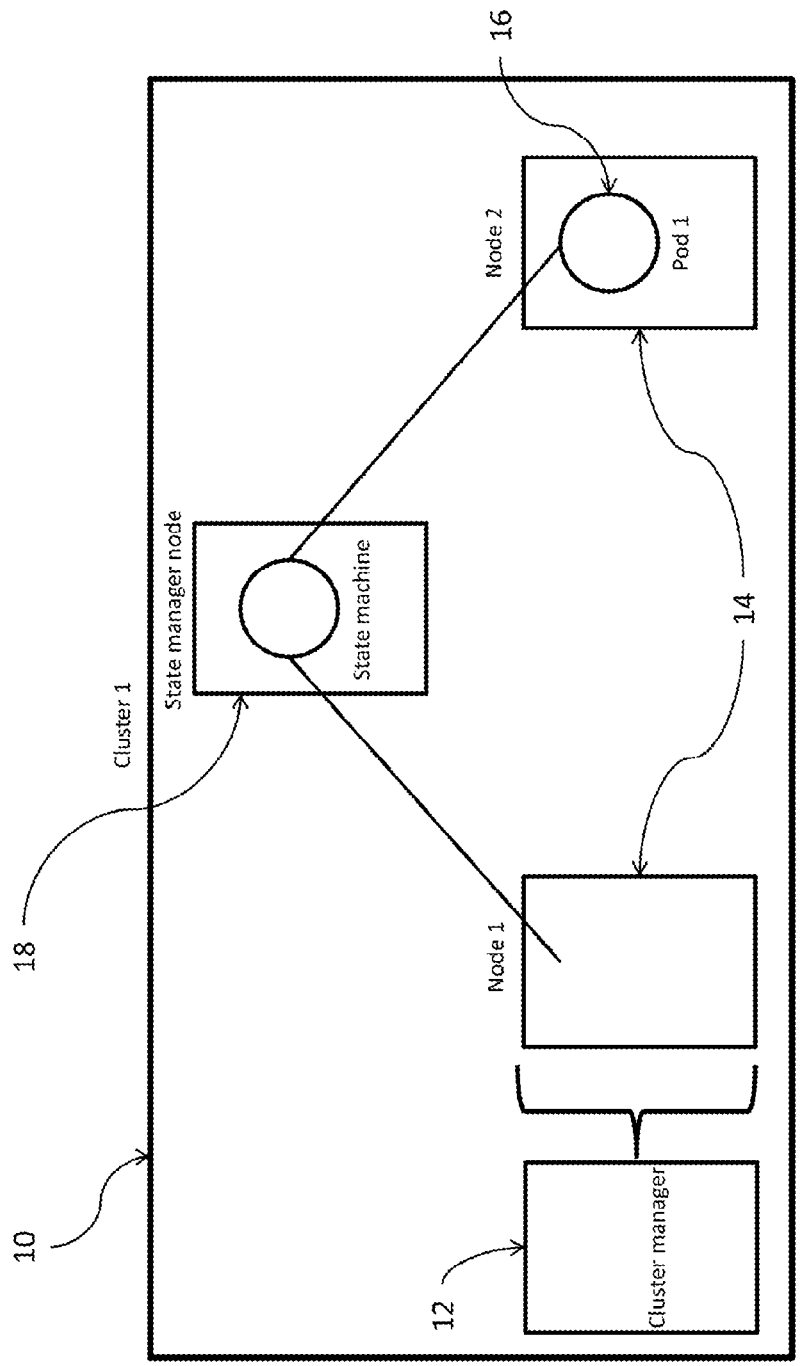
FIG. 3 is a depiction of a computing cluster in which the State manager removes the pod on Node 1 to the new Node 2 which is allocated with more processing power to handle the Pod 1's request. Pod 1 also has a monitoring program on the new Node 2, in accordance with an embodiment.
Figure 4:
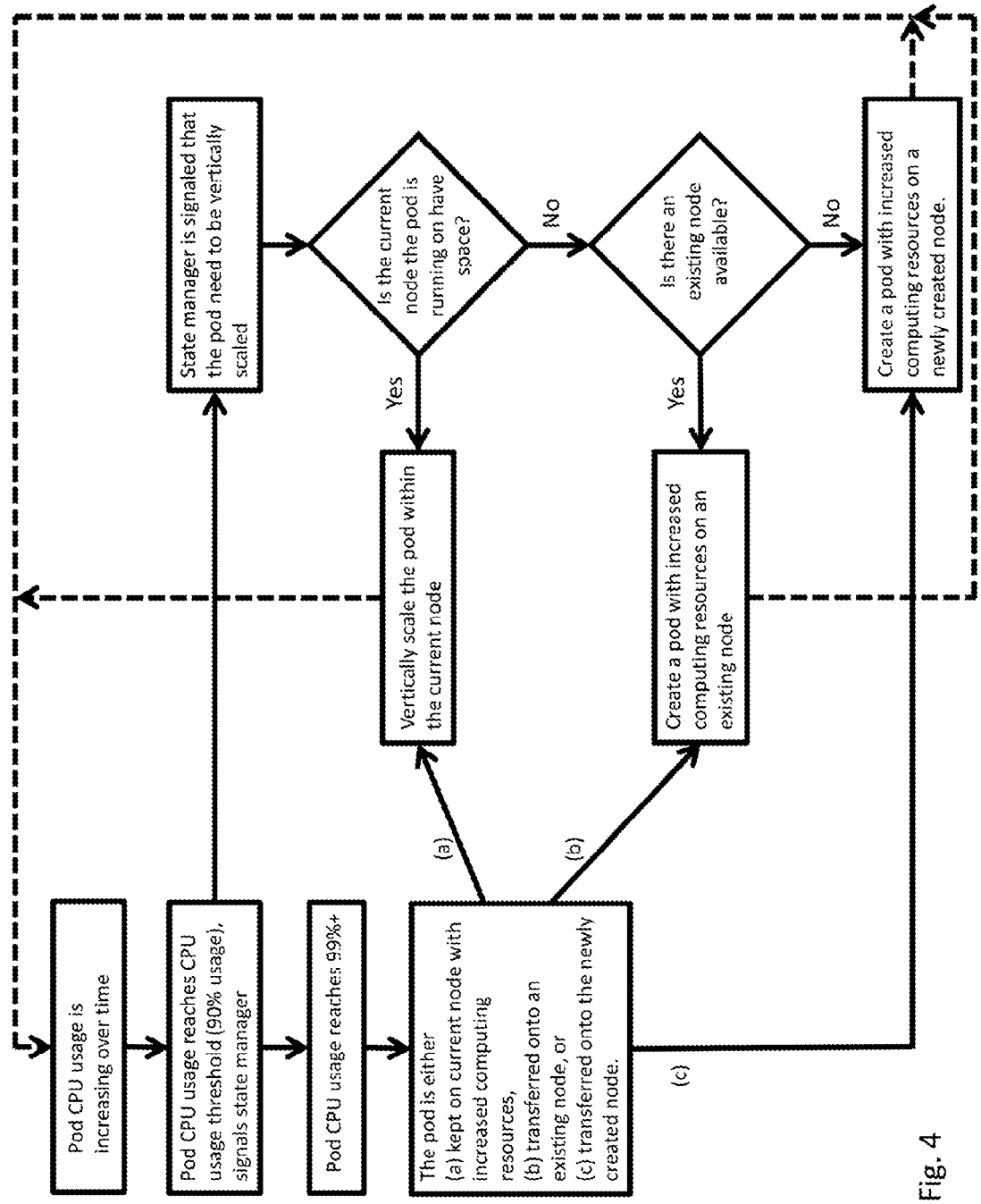
FIG. 4 is a flow chart of the method corresponding to the computer programming product.

Referring to FIG. 1, in one embodiment, is a computer cluster environment, designated generally by reference numeral 10, essentially comprising at least one cluster manager computer 12 and a plurality of working computing machines, referred to as nodes, 14, with a plurality of containerized computer applications, referred to as pods, 16 stored on each node 14, and a state machine/manager 18. The cluster master 12 runs the cluster's control plane processes, including the API server, scheduler, and core resource controllers. The master's 12 lifecycle is managed by the cluster's engine when a cluster is created or deleted. This includes upgrades to the version running on the cluster master 12, which the engine will perform automatically, or manually if desired to upgrade earlier than the automatic schedule.

The master 12 is the unified endpoint for the cluster 10. All interactions with the cluster 10 are done via API calls (e.g., Kubernetes API call), and the master 12 runs the API Server process to handle those requests. API calls can be made directly via HTTP/gRPC, or indirectly, by running commands from the Kubernetes command-line client (kubectl) or interacting with the user interface in the GCP Console.

The cluster master's 12 API server process is the hub for all communication for the cluster 10. All internal cluster processes (such as the cluster nodes, system and components, application controllers) all act as clients of the API server; the API server is the single "source of truth" for the entire cluster.

The cluster master 12 is responsible for deciding what runs on all of the cluster's nodes 14. This can include scheduling workloads on pods 16, like containerized applications, and managing the workloads' lifecycle, scaling, and upgrades. The master 12 also manages network and storage resources for those workloads.

The master 12 and nodes 14 also communicate using the cluster's APIs. Each node 14 is a worker machine that runs containerized applications and other workloads in pods 16. The individual machines are Compute Engine VM instances that the cluster engine creates when the cluster 10 is created.

Each node 14 is managed from the master 12, which receives updates on each node's self-reported status. Some manual control over node lifecycle may be exercised, or the engine can perform automatic repairs and automatic upgrades on the cluster's nodes 14.

Each node 14 runs the services necessary to support the pods 16 thereon (e.g., Docker containers that make up the cluster's workloads in Kubernetes). In Kubernetes, as an example, these would include the Docker runtime and the Kubernetes node agent (kubelet) which communicates with the master 12 and is responsible for starting and running Docker containers scheduled on that node 16.

Each node 16 is of a standard Compute Engine machine type that can be selected when a cluster 10 is created. The machine type specifies a particular collection of virtualized hardware resources available to a virtual machine (VM) instance, including the system memory size, virtual CPU (vCPU) count, and maximum persistent disk capability. For the n1 series of machine types, for example, a vCPU is implemented as a single hardware hyper-thread on one of the available CPU Platforms. Each has, for example, a fixed collection of resources such as 3.75 GB of memory per vCPU, 16 persistent discs, and 64 TB maximum size for each persistent disc.

In cluster 10, there may also be a number of special containers that run as per-node agents to provide functionality such as log collection and intra-cluster network connectivity.

Some of a node's resources are required to run the engine and various node components necessary to make that node 14 function as part of the cluster 10. As such, there may be a disparity between a node's total resources (as specified in the machine type documentation) and the node's allocatable resources in the engine. To inspect the node allocatable resources available in a cluster 10, standard commands may be run, with the returned output containing capacity and allocatable fields with measurements for ephemeral storage, memory, and CPU, as an example.

Allocatable resources are calculated in the following way: Allocatable=Capacity−Reserved−Eviction Threshold. For memory resources, the engine reserves the following in a Kubernetes cluster:
  25% of the first 4 GB of memory
  20% of the next 4 GB of memory (up to 8 GB)
  10% of the next 8 GB of memory (up to 16 GB)
  6% of the next 112 GB of memory (up to 128 GB)
  2% of any memory above 128 GB
  The engine serves an additional 100 MiB memory on each node for kubelet eviction.

A request for resources for pods 16 or to limit their resource usage may be made.

It is possible to manage local ephemeral storage resources as is done with CPU and memory resources. System reservations for local storage are made primarily for disk space used by container images.

If a node 14 does not consume all reserved storage, Pods 16 are still able to use the space. This does not prevent disk space from being used in any scenario.

Allocatable local ephemeral storage resources are calculated using the following formula, with an eviction threshold of 10% of storage capacity: Allocatable=Capacity−Reserved−Eviction Threshold The State Manager 18 is a program which could run on a server which is external to the cluster 10, and would be able to access the pods 16 within the system through a proxy or load balancer, which would be built into the cluster 10. It would be advantageous to have replicas of the state manager 18, in case the server on which it is running has any unexpected downtime.

The state manager 18 could also, however, be deployed within the cluster 10. This would bring the advantage of having lower latency on the communication between pods 16 and the state manager 18. In this case the state manager 18 would be replicated across multiple nodes 14 within the cluster 10 to ensure redundancy.

The individual pods 16 within a cluster 10 are, as described above, aware of their resource usage. A known command can be run within a pod 16 which will return various usage metrics of the host, for example the top command on a unix based system. There are also ways of monitoring resource usage which are built into Kubernetes, such as Prometheus (https://github.com/prometheus/prometheus), which enables the exporting of pod metrics to an endpoint.

There will be a program running on a loop within a processor of each pod 16 which will periodically initiate a POST HTTP request to the state manager, notifying it of the desired capacity in the case where the pod needs more resources. The desired capacity could be one of many pre-defined buckets of resources e.g. 2 GB, 4 GB, 8 GB of memory, and the pod 16 could simply request to enter the next bucket when its own resources are approaching the upper boundary of the previous bucket. The creator of the application could also inject custom logic and rules into the decision of when scaling needs to occur.

It is the job of the state manager 18 to handle the vertical scaling of the pod 16 once the pod 16 has requested additional resources. If there are enough resources available within the current node 14 (which the state manager 18 will store), then the pod 16 will be scaled within the current node 14. Otherwise, the state manager 18 will create a new node 14 within the cluster 10 and handle the transfer of the pod 16 to the new node 14, with the requested resources.

The present invention may be a system, a method, and/or a computer program product at any possible technical detail level of integration. The computer program product may include a computer readable storage medium (or media) having computer readable program instructions thereon for causing a processor to carry out aspects of the present invention.

Currently container orchestration systems such as kubernetes scale out the pods onto "already existing nodes". This introduces a limitation as if all nodes in the cluster are full and a pod needs scaling kubernetes does nothing. The state manager 18 solves this by automatically creating a new "node" with more resources when needed.

Creating a new node can be a timely process and as such the process of moving a pod to a newly created node to vertically scale it would be more efficient when pods are self-monitored. This would allow the pods to give some forewarning to the state manager so that it can decide if a new node needs to be created and if so start the process to create a new node before it is critically needed. For example:

A node is consistently running at ~70% CPU usage

The node CPU usage starts to increase over time

A threshold could be configured at a predetermined threshold, 90% CPU usage for example, that when hit sends a message to the State Manager 18 to indicate that it will soon need a new pod 16 with greater CPU capabilities.

The state manager 18 can at this point determine whether it is likely that a new node 16 will need to be created to accommodate this request or if there is an already available node 16 with sufficient free space for a pod 16 with a need for increased resources.

Given that it is determined that a new node 14 is required it can start the process early hence cutting down the time where a pod 16 is in the process of being vertically scaled.

Once the pod 16 hits the point where it definitely needs to be vertically scaled (e.g. 99%+ CPU usage) the new node 14 will already be either in the process of being created or is already ready for use. This brings about efficient utilization of nodes 16.

Each pod in the cluster monitors itself (as opposed to an external monitoring system), and makes request for more resources to the state manager. The ability for the pod to monitor itself, will be essential for the process.

In an aspect, a resilient solution is provided as there is not a single point of failure in terms of monitoring the pods 16 in the cluster 10. If the State Manager 18 fails over the other pods 16 can still be aware of the fact that they may require vertical scaling and may be able to take some secondary action given that vertically scaling is not an option, such as error messages/distress signals.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. A method for managing and allocating computing resources amongst a plurality of computing machines each of which has a plurality of containerized computer applications stored thereon and all of which are stored in a clustered computing environment, the method comprising:
   determining a first allocation scheme for allocating computing resources of a first physical computing machine among a plurality of containerized applications configured to run on the first physical computing machine;
   allocating the computing resources of the first physical computing machine according to the first allocation scheme wherein each containerized application allocates an initial set of computing resources;
   determining, based on receipt of computing resource data from a resource monitor, while running the plurality of the container applications, that a first containerized application needs additional computing resources;
   responsive to determining the first containerized application needs additional computing resources, creating a second allocation scheme for allocating the computing resources of the first physical computing machine among a plurality of containerized applications running on the first physical computing machine, wherein the second allocation scheme transfers a set of transferred computing resources from a second containerized application to the first containerized application;

while running of the plurality of containerized applications, re-allocating the computing resources of the first physical computing machine in accordance with the second allocation scheme so that each containerized application is respectively allocated a revised set of computing resources, whereby the first containerized application receives the set of transferred resources from the second containerized application;

deducting, by an adapted resource allocator, computing resources from a second computing machine of the plurality of computing machines and creating a new containerized computer application within the first computing machine;

deducting resources from the newly containerized computer application stored within the first computing machine and assigning the computing resources of the newly containerized computer application received from the second computing machine to the first containerized computer application or the second containerized computer application, if the first computing machine does not have sufficient computing resources available and the second existing computing machine does have sufficient computing resources.

2. The method of claim 1, further comprising deploying a state manager within a cluster of the clustered computing environment, thereby lowering latency on the communication between pods of the clustered computing environment and the state manager.

3. The method of claim 2, further comprising replicating the state manager across multiple nodes within the cluster.

4. The method of claim 1, wherein the computing resource data comprises percent CPU usage.

5. The method of claim 1, further comprising allocating computing resources at a threshold of percent CPU usage via the adapted resource allocator.

6. The method of claim 1, further comprising allocating, via the adapted resource allocator, computing resources from one containerized computer application to another of the containerized computer applications stored within the same computing machine if the said computing machine has sufficient computing resources available.

7. The method of claim 1, further comprising sending error messages or distress signals for individual pods requiring greater computing resources if the first containerized application fails or does not find additional computing resources.

8. The method of claim 1, wherein each pod reads the percent CPU usage for said pod.

9. A method for managing and allocating computing resources amongst a plurality of computing machines in a clustered computing environment, the method comprising:

deducting, by an adapted resource allocator, computing resources from a first computing machine of the plurality of computing machines in the clustered computing environment;

creating, by the adapted resource allocator, a new containerized computer application within a second computing machine using the computing resources deducted from the first computing machine;

deducting, by the adapted resource allocator, the computing resources from the new containerized computing application; and assigning, by the adapted resource allocator, the computing resources deducted from the new containerized computing application stored within the second computing machine to another containerized computing application stored within the second computing machine, if the second computing does not have sufficient computing resources available and there exists the first computing machine within the plurality of computing machines with sufficient computing resources.

10. The method of claim 9, wherein the adapted resource allocator begins allocating resources from the new containerized computing application of the new computing machine to the another containerized computer application at a threshold percentage of CPU usage.

11. The method of claim 9, further comprising:
deploying a state manager within a cluster of the clustered computing environment, lowering latency in the communication between pods of the cluster and the state manager.

12. The method of claim 11, further comprising:
replicating the state manager across multiple nodes within the cluster.

13. The method of claim 9, further comprising:
determining, by the adapted resource allocator, based on receipt of computing resource data that the another containerized application, that the another containerized application needs additional computing resources.

14. The method of claim 13, wherein the computing resource data comprises percent usage of a CPU.

15. The method of claim 14, wherein assigning the computing resources deducted from the new containerized computing application stored within the second computing machine occurs at a threshold of the percent CPU usage.

16. The method of claim 9, further comprising:
sending error messages or distress signals for individual pods requiring greater computing resources if the second computing machine fails or does not find the additional computing resources.

17. The method of claim 14, wherein each pod of the clustered computing environment reads the percent usage of the CPU.

* * * * *